May 26, 1964  A. JENSEN  3,134,335
ROTARY ENGINE WHICH MAY COMPRISE A PUMP OR A MOTOR
Filed March 14, 1962  2 Sheets-Sheet 1
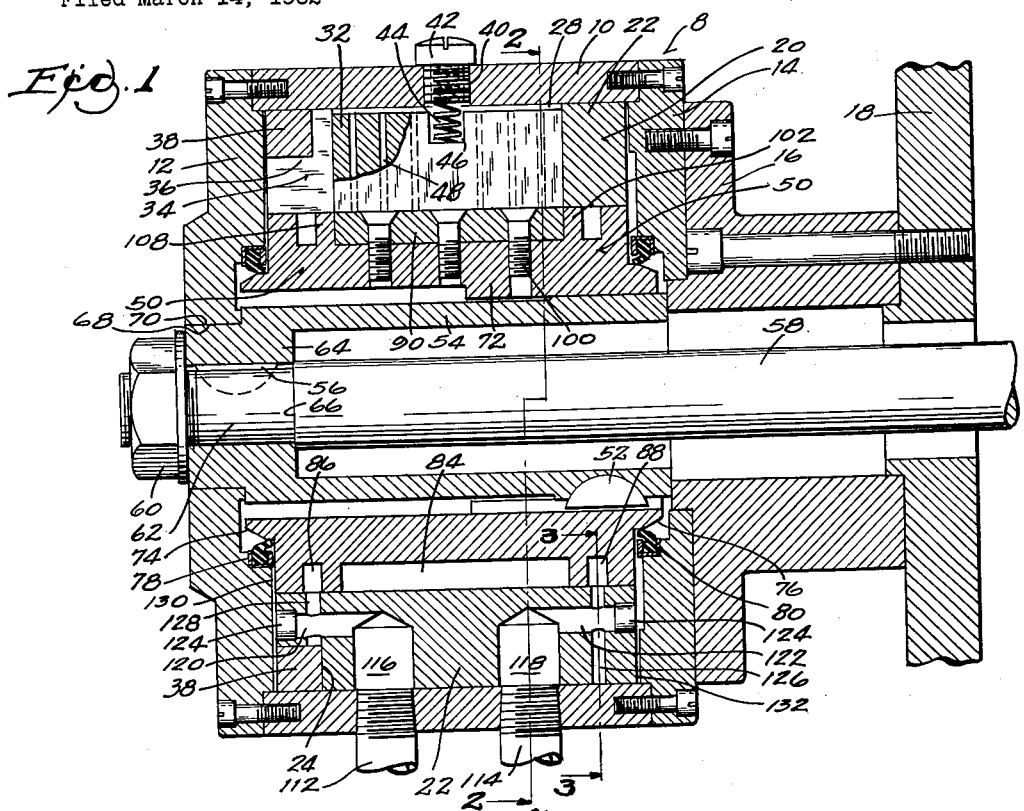
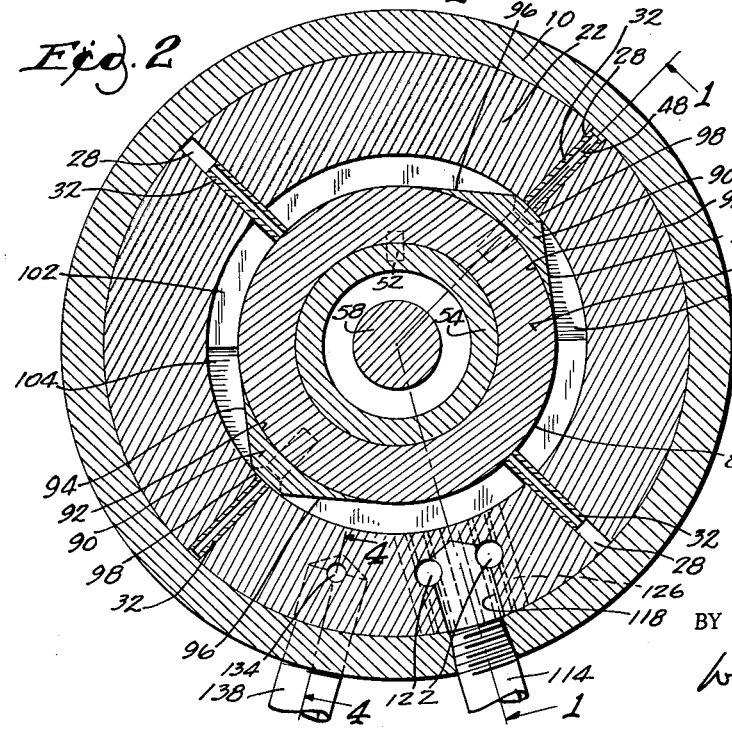
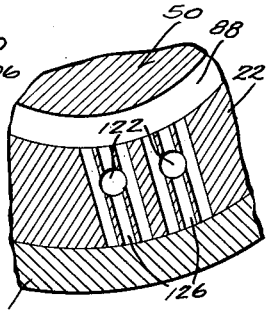
INVENTOR.
AAGE JENSEN
BY
Wheeler, Wheeler & Wheeler
ATTORNEYS May 26, 1964  A. JENSEN  3,134,335
ROTARY ENGINE WHICH MAY COMPRISE A PUMP OR A MOTOR
Filed March 14, 1962  2 Sheets-Sheet 2
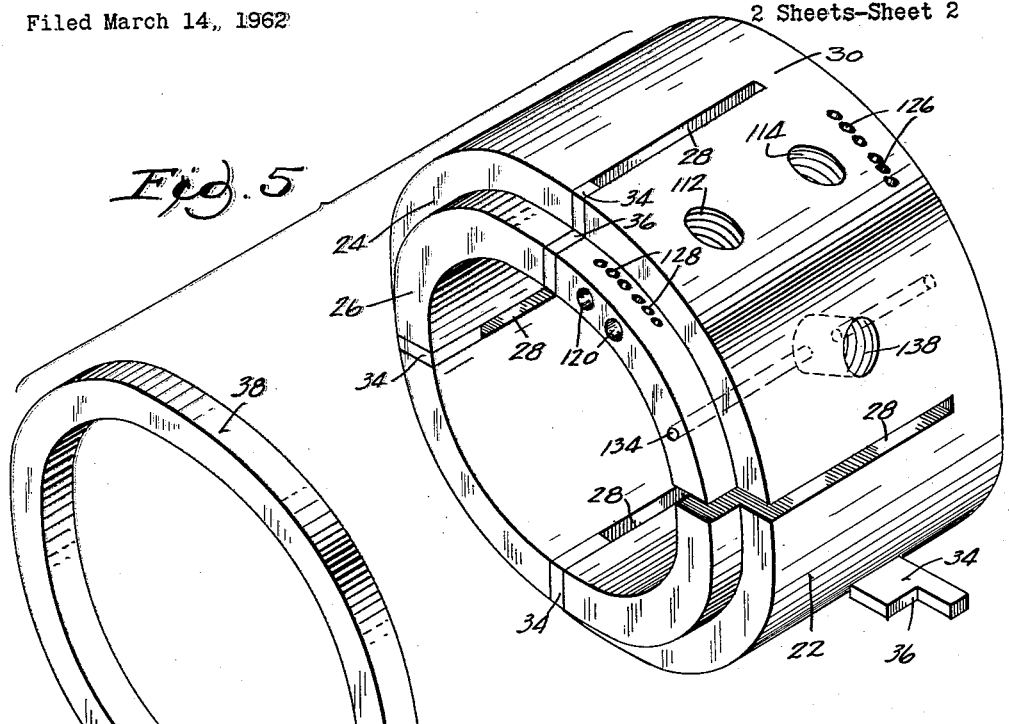
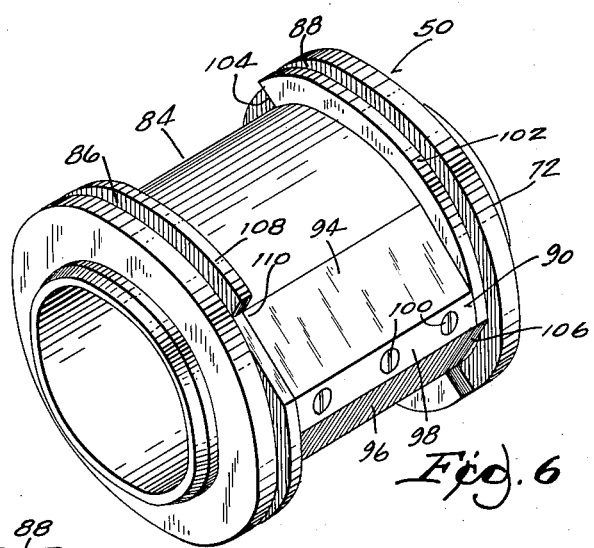
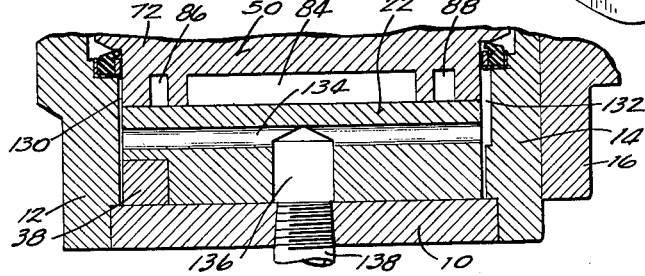
INVENTOR.
AAGE JENSEN
BY
Wheeler, Wheeler & Wheeler
ATTORNEYS

United States Patent Office 3,134,335
Patented May 26, 1964

3,134,335
ROTARY ENGINE WHICH MAY COMPRISE A PUMP OR A MOTOR
Aage Jensen, 2515 Arlington Ave., Racine, Wis.
Filed Mar. 14, 1962, Ser. No. 179,581
8 Claims. (Cl. 103—123)

This invention relates to a rotary engine which may comprise a pump or a motor. For the purpose of this description the device will be assumed to be a motor. The present invention is a specific improvement on the subject matter of my Patent 2,398,313.

Fluid under pressure is admitted to an annular cylinder space between a stator and a rotor. Vanes against which the pressure reacts are reciprocable to clear abutments acted upon by the pressure to cause rotor rotation. One of the features of the present invention consists in forming these abutments as cams so that they perform the dual function of reciprocating the vanes and receiving the thrust of the fluid.

The conduits through which the pressure fluid is admitted and discharged communicate with axial ducts intersecting multiple radial ducts which lead to a pair of circumferential channels formed in the rotor and sealed by the stator. These channels communicate at intervals with the annular cylinder space between the rotor and the housing. Two points of communication for the pressure liquid are diametrically opposite each other at one end of the cylinder space while the ports communicating with the discharge channel are diametrically opposite each other at the opposite end of the cylinder space, the latter diameter being offset ninety degrees from the diameter upon which the admission ports are located.

Seals prevent the escape of fluid which leaks from the ducts and means is provided for picking up the leakage and draining it to a point of discharge.

In order to provide slots in the stator, I mill these slots into the stator from one end thereof. The material removed from that end in order to facilitate the cutting of the slots is then replaced by inserts carefully machined to fit into the slots outside the ways in which the vanes are reciprocable. The inserts are notched to provide shoulders of substantial axial extent and these shoulders register with an annular notch in the end of the stator. A ring shrunk onto the notched end of the stator to embrace the corresponding notches of the inserts completes the cylindrical form of the stator within the housing.

Threaded openings through the housing into the slots in which the vanes are reciprocable receive socketed plugs which serve as seats for compression springs acting upon the respective vanes to urge them inwardly as they follow the surface of the rotor within the cylinder space and ride over the cam and abutment means provided on the periphery of the rotor in the path of the vanes.

The cam abutments are desirably separately prefabricated and screwed into place on the otherwise cylindrical rotor.

In the drawings:

FIG. 1 is a view taken in section on the line 1—1 of FIG. 2 and generally axial through a rotary engine embodying the invention.

FIG. 2 is a view taken in transverse section on the line 2—2 of FIG. 1.

FIG. 3 is a detail view taken in section on the line 3—3 of FIG. 1.

FIG. 4 is a view taken in section on the line 4—4 of FIG. 2.

FIG. 5 is an exploded view in perspective of the stator as it appears with one of the slot-closing plugs and the retaining ring disassembled.

FIG. 6 is a detail view in perspective of the rotor.

The housing generically designated by reference character 8 comprises an annular peripheral wall 10 to which the annular end walls 12 and 14 are bolted. The housing is supported by mounting bracket 16 from frame member 18 as shown in FIG. 1.

The stator generically designated by reference character 20 and separately illustrated in FIG. 5 may be regarded as a part of the housing, although, for convenience, it is separately fabricated. It comprises a ring 22 shouldered to provide a portion 24 of reduced diameter at the end 26 of the ring. A series of slots 28 are milled in the ring. These slots are cut from the end 26 thereof and terminate short of the end 30. In the instant device there are four such slots at ninety degree intervals and they provide ways in which the vanes 32 are radially reciprocable. After the slots are milled, the end portion of each is closed by an insert 34, one of which is separately illustrated in FIG. 5. Each such insert has a notch at 36 corresponding in form to the shoulder 24 of the stator 22. After the carefully fitted inserts 34 are in place as shown in FIG. 5, the ring 38 is applied about the shouldered portion 24 of the stator and engaged in the notches 36 of the inserts 34 to maintain the inserts in the assembly as shown in FIG. 1.

Opposite each of the ways provided by slots 28 the annular housing member 10 is provided with a screw threaded opening 40 for the socket screw 42 in which a spring 44 is seated. The spring has a further seat in a notch 46 in the vane 32 which is reciprocable in the particular way or slot 28. The bias of spring 44 urges the vane centrally to engage the rotor. As will be explained hereinafter the vane is urged outwardly against the bias of spring 44 by a cam on the rotor. A series of ducts 48 extending radially through each vane equalizes the pressure to permit the vane to move freely without trapping fluid in, or developing a vacuum in, the outer end of the way.

The rotor generically designated by reference character 50 and separately illustrated in FIG. 6 comprises an annulus 72 connected by key 52 to a hub 54 keyed at 56 to the end of shaft 58. Except in the vicinity of the key 56 the hub 54 is entirely free of shaft 58 to minimize alignment problems. A nut 60 threaded to the reduced extremity 62 of the shaft holds portion 64 of the hub against the shaft shoulder 66, adjacent the key. The hub may have a reduced extremity 68 machined to turn within the bearing portion 70 of the housing end wall 12.

The rotor annulus 72 has bevelled end surfaces at 74 and 76 which respectively guide the lips of the seals 78 and 80 during assembly.

In the outer periphery of the rotor annulus 72 is a broad central cylinder channel 84 and two narrow channels 86 and 88 spaced axially from the central channel 84. The cylinder channel 84 receives the working fluid. The channels 86 and 88 are interchangeably adapted to serve as inlet and outlet conduits for such fluid.

In the instant device, using four vanes 32 I preferably provide two diametrically opposite cam and abutment means 90 which displace the fluid when the device is operating as a pump and are acted upon by the fluid to rotate the rotor 50 when the device is functioning as a motor. In addition, the cam and abutment means 90 raise the several vanes 32 and control the return thereof in synchronism with relative rotation between the rotor and stator, it being understood that in certain applications the part here designated as a stator may comprise the rotor and the part here designated as a rotor may comprise the stator. My former patent above identified suggests one port arrangement appropriate for an arrangement in which the annulus 72 is the stator and the annulus 22 is the rotor.

For convenience of manufacture it is preferred that each of the cam abutments 90 be separately fabricated to provide an inner peripheral surface 92 which fits the annulus 72 and to provide tangential cam surfaces at 94 and 96 which converge radially outwardly to an arcuate outer surface 98 closely fitting the inner periphery of the annulus 22 within the channel 84. The length of the prefabricated cam abutment 90 corresponds to the width of the channel as clearly appears in FIG. 1. The prefabricated cam and abutment is held to the annulus 72 by screws 100.

The rib or flange 102 which separates the cylinder channel 84 from the peripheral conduit channel 88 at the right hand side of the rotor annulus 72, as viewed in FIGS. 1 and 6 is cut away to provide a generally triangular port at 104 in registry with the tangential face 94 of one cam abutment 90. The same rib or flange 102 is cut away to provide another generally triangular port 106 diametrically opposite the port 104 and in registry with the tangential face 96 of the other cam abutment. The port arrangement appears very clearly in FIG. 2 and is also apparent in FIG. 6.

Similarly the rib or flange 108 which is at the left end of rotor annulus 72 as viewed in FIG. 1 and FIG. 6 is cut to provide generally triangular ports such as that shown at 110 in FIG. 6. Port 110 registers with the tangential face 94 of the same abutment 90 which has its opposite tangential face 96 in registry with port 106 of rib 88.

The fluid supply and relief connections provided by pipes 112 and 114 (FIG. 1) are interchangeable in the sense that fluid under pressure may be supplied to either, the discharged fluid being withdrawn through the other. The pipes 112, 114 communicate respectively with bores at 116, 118. These bores intersect axial ducts 120, 122. Preferably, there are two of each spaced to communicate with the bores 116, 118 at opposite sides of the respective bores as clearly appears in FIG. 2. The bores 120, 122 are conveniently drilled axially from opposite ends of the stator annulus 22 and have terminal closures 124. These ducts, in turn, intersect a series of radial ducts 126 in the manner best shown in FIG. 1 and FIG. 3, these being drilled from the outside of the annulus 22 and requiring no closure because of the close fit of annulus 22 in the housing ring 10. The ducts 126 lead directly into channel 88. Similar ducts 128 at the left hand end of the stator as viewed in FIG. 1 lead into channel 86 and are closed by the ring 38 which retains the closure inserts 34 at the ends of slots 28.

Clearance is provided at 130 and 132 between the end plates 12 and 14 and the corresponding ends of the annuli 72 and 22 (FIG. 4). At least one transverse duct 134 communicating both with the clearance at 130 and that at 132 is intersected by a bore 136 from which the drain pipe 138 opens to discharge leakage. As best shown in FIG. 2, the drain pipe is offset angularly from the inlet and outlet pipes 112, 114, which, in practice, are side by side in the same plane.

Assuming fluid under pressure to be admitted through duct 114 with the rotor 50 in the position shown in FIG. 2, it will be apparent that the pressure fluid in channel 88 will be admitted concurrently through ports 104 and 106 into the central channel 84. The fluid entering channel 84 through duct 106 will not be able to displace circumferentially the vane 32 which is at the lower right in FIG. 2. Accordingly, the pressure will be exerted upon the cam abutment 90 which is at the upper right, thus tending to cause rotor 50 to turn in a counter-clockwise direction.

Similarly the fluid admitted through the port 104 will react against the relatively non-rotatable vane 32 at the upper left in FIG. 2 and will spend its energy against cam abutment 90 at the lower left in FIG. 2, likewise in a direction tend to turn rotor 50 in a counter-clockwise direction.

As the rotor turns, the opposite cam abutments 90 shown at the upper right and lower left in FIG. 2 will pass from beneath the vanes which are shown to be engaged with the outer peripheral surfaces 98 of the respective abutments. These vanes will thereupon move inwardly under the bias of their respective springs and almost immediately after these vanes reach the bottom of channel 84 the cam abutments will move beneath the vanes at the upper left and lower right in FIG. 2 to elevate these vanes against the bias of their respective springs 44 (shown in FIG. 1).

Fluid displaced ahead of the respective cam abutments 90 escapes through the ports 110 at the opposite end of the device to enter channel 86 for discharge from pipe 112.

If the fluid pressure is applied through pipe 112 the rotor will turn clockwise instead of counter-clockwise as viewed in FIG. 2 and the discharge will occur through pipe 114.

The fact that the same structure which provides the abutment against which the fluid pressure acts is also finished to serve as the cam for controlling the reciprocation of the successive vanes is a factor which greatly simplifies the construction as compared with the disclosure of my former patent above identified.

I claim:

1. In a rotary engine, the combination with relatively rotatable inner and outer members, the inner member being provided with a peripheral cylinder channel and the outer member with radial ways communicating with said channel, of vanes reciprocable in the ways to and from positions in which they extend into the channel, combination cam and abutment means in the channel for urging successive vanes outwardly in the ways in the course of relative rotation between said members, means biasing the vanes inwardly, and means for providing inlet and outlet ducts communicating with said channel, the inner of said members being provided with conduit channels axially offset from the cylinder channel at opposite ends thereof and with intervening ribs separating the conduit channels from the cylinder channel, said ribs having ports opening oppositely through them to provide communication between the respective conduit channels and the cylinder channel, the ports being located adjacent the combination cam and abutment means, and the said conduit channels and ports constituting part of the duct means aforesaid.

2. An engine according to claim 1 in which the combination cam and abutment means comprises a prefabricated element having a surface fitted to the bottom of the cylinder channel and a length corresponding to the width of the cylinder channel and having other surfaces tangential to the bottom of the cylinder channel and converging outwardly to a height equal to the depth of the channel.

3. In a rotary engine, the combination with relatively rotatable inner and outer members, the inner member being provided with a peripheral cylinder channel and the outer member with radial ways communicating with said channel, of vanes reciprocable in the ways to and from positions in which they extend into the channel, combination cam and abutment means in the channel for urging successive vanes outwardly in the ways in the course of relative rotation between said members, means biasing the vanes inwardly, and means for providing inlet and outlet ducts communicating with said channel, in further combination with a housing having a peripheral wall and end walls and enclosing the outer of said members, the outer member having slots extending from one of its ends toward the other end and terminating short of said other end, the slots extending radially from the inner periphery to the outer periphery of the outer member, means filling the slots at the end of the outer member at which such slots open from said outer member, said filling means being peripherally notched and a ring encircling the outer member and fitting the notches of the filler means, said outer member and ring having surfaces closely confined within the peripheral wall of the housing.

4. In a rotary engine the combination with relatively rotatable inner and outer members, the inner member being provided with a peripheral cylinder channel and the outer member with radial ways communicating with said channel, of vanes reciprocable in the ways to and from positions in which they extend into the channel, combination cam and abutment means in the channel for urging successive vanes outwardly in the ways in the course of relative rotation between said members, means biasing the vanes inwardly, and means for providing inlet and outlet ducts communicating with said channel, the outer member having inner and outer peripheries and radial slots opening to both of said peripheries and cut from one end toward the other of the outer member, inserts filling portions of the slots adjacent said one end and closing the slots to constitute the ways in which the vanes are reciprocable, the said outer member and inserts having portions of reduced radial extent at said one end, and a retaining ring encircling the portions of reduced radial extent and confining said inserts.

5. In a rotary engine, the combination with relatively rotatable inner and outer members, the inner member being provided with a peripheral cylinder channel and the outer member with radial ways communicating with said channel, of vanes reciprocable in the ways to and from positions in which they extend into the channel, combination cam and abutment means in the channel for urging successive vanes outwardly in the ways in the course of relative rotation between said members, means biasing the vanes inwardly, and means for providing inlet and outlet ducts communicating with said channel, the inner of said members being provided with conduit channels axially offset from the cylinder channel at opposite ends thereof and with intervening ribs separating the conduit channels from the cylinder channel, said ribs having ports opening oppositely through them to provide communication between the respective conduit channels and the cylinder channel, the ports being located adjacent the combination cam and abutment means, and the said conduit channels and ports constituting part of the duct means aforesaid, in further combination with means for non-rotatably supporting the outer of said members, a hub connected to the inner member at one end thereof for rotation therewith, said hub having a shaft receiving opening near its other end and a cavity extending therefrom to its said one end, and a shaft extending through the cavity into the opening and provided with means connecting it solely adjacent said one end with said hub.

6. An engine according to claim 5 in which a housing enclosing the outer of said members constitutes the means for non-rotatably supporting said outer member, said housing having a mounting bracket.

7. The combination with an annular mounting bracket, of a housing comprising a ring and a pair of annular end walls, one of which has means connecting it with the mounting bracket, a stator annulus fixed within the housing and provided with radial ways, a rotor annulus having a peripheral cylinder channel registering with the ways, vanes operatively mounted in the ways and reciprocable to and from advanced positions of projection into the rotor cylinder channel, means biasing the respective vanes toward such advanced positions, cam and abutment means carried by the rotor annulus within the cylinder channel, the vanes having cam follower portions constituting means for engagement with the cam and abutment means for the displacement of the vanes outwardly against said bias and for controlling the return of vanes into the cylinder channel, the rotor having fluid supply and discharge ducts peripherally encircling the rotor in positions axially spaced from the ends of the cylinder channel and having ports providing communication between the cylinder channel and the respective ducts adjacent the cam and abutment means and in relatively angularly offset positions, means providing ducts in the stator communicating respectively with the supply and discharge channels of the rotor, means providing seals between the ends of the rotor and the end plates of the housing and means for discharging from the stator annulus leakage trapped by said seals.

8. An engine according to claim 7 in which the rotor annulus is provided with a hub mounted for rotation in said housing, said hub having a shaft receiving opening adjacent one of its ends and an enlarged cavity extending from said opening to the other end of the hub, and a shaft extending into the said opening and there connected with the hub, said shaft projecting from said opening through the cavity and extending from the said other end of the hub.

References Cited in the file of this patent

UNITED STATES PATENTS

| | | |
|---|---|---|
| 985,562 | Williams | Feb. 28, 1911 |
| 1,044,782 | Hermanns | Nov. 19, 1912 |
| 1,805,023 | Springsteen | May 12, 1931 |
| 2,583,633 | Cronin | Jan. 29, 1952 |
| 2,665,638 | Lauck | Jan. 12, 1954 |
| 2,956,845 | Wahlmark | Oct. 18, 1960 |

FOREIGN PATENTS

| | | |
|---|---|---|
| 81,882 | Denmark | Sept. 24, 1956 |
| 323,101 | Great Britain | Dec. 24, 1929 |
| 523,753 | Italy | Apr. 18, 1955 |
| 68,969 | Netherlands | June 15, 1951 |